United States Patent
Chan et al.

(10) Patent No.: US 9,725,647 B1
(45) Date of Patent: Aug. 8, 2017

(54) ANTI-COUNTERFEITING YARN AND PREPARATION METHOD THEREOF

(71) Applicant: Techid Limited, Hong Kong (HK)

(72) Inventors: Kwok Keung Chan, Hong Kong (HK); Chun Yu Yeung, Hong Kong (HK); Chin Ho So, Hong Kong (HK)

(73) Assignee: Techid Limited, Hong Kong (HK)

( * ) Notice: Subject to any disclaimer, the term of this patent is extended or adjusted under 35 U.S.C. 154(b) by 0 days.

(21) Appl. No.: 15/289,953

(22) Filed: Oct. 10, 2016

(51) Int. Cl.
*D01F 1/04* (2006.01)
*C09K 11/77* (2006.01)
*D01F 1/00* (2006.01)
*D01F 6/00* (2006.01)
*D01D 5/12* (2006.01)

(52) U.S. Cl.
CPC ............ *C09K 11/7791* (2013.01); *D01D 5/12* (2013.01); *D01F 1/00* (2013.01); *D01F 6/00* (2013.01)

(58) Field of Classification Search
CPC ........ D01F 1/04; D02G 3/346; D02G 3/3144; Y10T 428/2915
See application file for complete search history.

(56) References Cited

U.S. PATENT DOCUMENTS

| | | | |
|---|---|---|---|
| 5,321,069 A | 6/1994 | Owens | |
| 2004/0099740 A1* | 5/2004 | Chresand | G02B 5/0284 235/457 |
| 2010/0062251 A1* | 3/2010 | Merchant | D01D 5/30 428/374 |
| 2011/0018252 A1* | 1/2011 | Petry | C09C 1/0015 283/72 |
| 2012/0064134 A1* | 3/2012 | Bourke, Jr. | A61Q 17/04 424/401 |
| 2015/0329996 A1* | 11/2015 | Hahm | D01F 1/04 428/35.2 |

FOREIGN PATENT DOCUMENTS

| | | |
|---|---|---|
| CN | 101519807 A | 9/2009 |
| CN | 101759963 A | 6/2010 |
| CN | 102140662 A | 8/2011 |
| WO | WO 2014/061958 * | 4/2014 |

* cited by examiner

*Primary Examiner* — Carol M Koslow

(57) ABSTRACT

An anti-counterfeiting yarn includes a uniformly distributed up-conversion fluorescent material and a polymer, wherein the up-conversion fluorescent material comprises a maximum weight percent of about 1.8%. A method of preparing an anti-counterfeiting yarn includes mixing functional polymer chips containing up-conversion fluorescent material with polymer chips not containing up-conversion fluorescent material in a ratio such that the fluorescent material is uniformly distributed in the mixture, melting the mixture, extruding the melt into filaments, and producing anti-counterfeiting yarn through spinning and drawing the filaments.

8 Claims, 2 Drawing Sheets

US 9,725,647 B1

ANTI-COUNTERFEITING YARN AND PREPARATION METHOD THEREOF

TECHNICAL FIELD

The present application relates to a fluorescent material and a method of preparing the same. More particularly, the present application relates to an anti-counterfeiting yarn (ACY) with uniformly distributed and controllable amount of up-conversion fluorescent material and a preparation method thereof.

BACKGROUND

Up-conversion fluorescent materials have the characteristics of being chemically stable at room temperature, non-toxic and easily concealed on the products to be protected until excited by infrared light intentionally. It is widely used in high-end anti-counterfeiting fields such as credit cards, bank notes, brand labels, etc.

One of the common methods of making phosphorescent yarns involves coating a layer of fluorescent materials onto the surface of the yarns. However, the fluorescent coating is not sustainable, and the original color of the yarns is also affected.

Therefore, there exists a need for fluorescent yarns with uniformly distributed up-conversion fluorescent material and anti-counterfeiting property.

SUMMARY

In one aspect, the present application provides an anti-counterfeiting yarn, including a uniformly distributed up-conversion fluorescent material and a polymer, wherein the up-conversion fluorescent material includes a maximum weight percent of about 1.8%.

In some embodiments, the anti-counterfeiting yarn may be made of a plurality of filaments. Each of the filaments may include the uniformly distributed up-conversion fluorescent material.

In certain embodiments, the polymer may include at least one polymer selected from the group consisting of polyamide, polyester, polyolefin, polycarbonate, and vinyl polymer.

In some embodiments, the polymer may include at least one polymer selected from the group consisting of polyethylene terephthalate, polypropylene, polystyrene, polyvinyl chloride, and acrylonitrile butadiene styrene resin.

In certain embodiments, the polymer may include polyethylene terephthalate.

In some embodiments, the up-conversion fluorescent material may include lanthanide ions.

In certain embodiments, the up-conversion fluorescent material may include yttrium fluoride doped with ytterbium and erbium.

In some embodiments, the polymer may include at least one polymer selected from the group consisting of polyamide, polyester, polyolefin, polycarbonate, and vinyl polymer.

In certain embodiments, wherein the polymer may include at least one polymer selected from the group consisting of polyethylene terephthalate, polypropylene, polystyrene, polyvinyl chloride, and ABS resin.

In some embodiments, the polymer may include polyethylene terephthalate.

In certain embodiments, the up-conversion fluorescent material may include lanthanide ions.

In some embodiments, the up-conversion fluorescent material may include yttrium fluoride doped with ytterbium and erbium.

In another aspect, the present application provides a method of preparing an anti-counterfeiting yarn, including: providing an up-conversion fluorescent material in a powder form having a particle size of about 0.3-7 μm; mixing the up-conversion fluorescent material with a molten polymer material to form a composite material; cooling the composite material, followed by cutting to provide a functional polymer chip (FPC); mixing the FPC with a polymer chip not containing the up-conversion fluorescent material in a ratio such that the fluorescent material is uniformly distributed in the mixture, followed by melting the mixture; extruding the melt of the FPC and the polymer chip not containing the up-conversion fluorescent material into filaments; and producing the anti-counterfeiting yarn through spinning and drawing the filaments, wherein the up-conversion fluorescent in the anti-counterfeiting yarn may include a maximum weight percent of about 1.8%.

In some embodiments, the molten polymer material and the polymer chip not containing the up-conversion fluorescent material may be each made of at least one polymer selected from the group consisting of polyamide, polyester, polyolefin, polycarbonate, and vinyl polymer.

In certain embodiments, the polymer may include at least one polymer selected from the group consisting of polyethylene terephthalate, polypropylene, polystyrene, polyvinyl chloride, and ABS resin.

In some embodiments, the polymer may include polyethylene terephthalate.

In certain embodiments, the up-conversion fluorescent material may include lanthanide ions.

In some embodiments, the up-conversion fluorescent material may include yttrium fluoride doped with ytterbium and erbium.

In certain embodiments, the FPC and the polymer chip not containing the up-conversion fluorescent may have a similar size, such that the chips can be uniformly mixed.

In some embodiments, the method may further include mixing dyes with the FPC and the polymer chip not containing the up-conversion fluorescent material.

BRIEF DESCRIPTION OF THE DRAWINGS

Specific embodiments of the ACY and its preparation method will be described with reference to the accompanying drawings wherein.

DETAILED DESCRIPTION

Reference will now be made in detail to preferred embodiments of the anti-counterfeiting yarn and its preparation method disclosed in the present application, examples of which are also provided in the following description. Exemplary embodiments of the anti-counterfeiting yarn and its preparation method disclosed in the present application are described in detail, although it will be apparent to those skilled in the relevant art that some features that are not particularly important to an understanding of the anti-counterfeiting yarn and its preparation method may not be shown for the sake of clarity.

Before the present application is described in further detail, it is to be understood that the terminology used herein is for the purpose of describing particular embodiments only, and is not intended to be limiting, since the scope of the present application will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the application. The upper and lower limits of these smaller ranges may independently be included in the smaller ranges is also encompassed within the application, subject to any specifically excluded limit in the stated range. Where the stated range includes one or both of the limits, ranges excluding either or both of those included limits are also included in the application.

Unless defined otherwise, all technical and scientific terms used herein have the same meaning as commonly understood by one of ordinary skill in the art to which this application belongs. Although any methods and materials similar or equivalent to those described herein can also be used in the practice or testing of the present application, a limited number of the exemplary methods and materials are described herein.

It must be noted that as used herein and in the appended claims, the singular forms "a", "an", and "the" include plural referents unless the context clearly dictates otherwise.

One aspect of the present application relates to a method of making an anti-counterfeiting yarn with the flexibility in controlling the uniformity and exact amount of up-conversion fluorescent material distributed therein.

Figure 2:
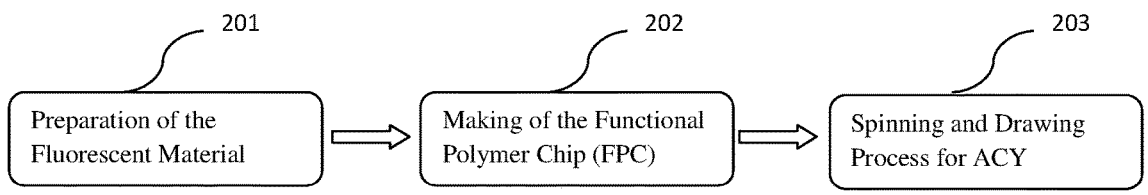
FIG. 2 shows a flow chart illustrating the method of preparing the ACY according to an embodiment the present application.

An embodiment of the method of preparing the ACY according to the present application is illustrated in FIG. 2.

Referring to FIG. 2, the method generally includes:

Step 201: Preparation of the Fluorescent Material

Up-conversion (UC) is a process in which the sequential absorption of two or more photons leads to the emission of light at a shorter wavelength than the excitation wave length. It is an anti-Stokes type emission. An example is the conversion of infrared light to visible light. Materials in which up-conversion can take place often contain ions of d-block and f-block elements. Examples of these ions are $Ln^{3+}$, $Ti^{2+}$, $Ni^{2+}$, $Mo^{3+}$, $Re^{4+}$, $Os^{4+}$, and the like.

UC fluorescent or luminescent materials generally include a host material and doping ions. Lanthanide (Ln) elements are commonly used as dopants due to their unique electronic configurations and energy level structures. $Er^{3+}$ and $Tm^{3+}$ are two examples of the Ln ions which exhibit effective UC luminescent property. Another Ln ion is often additionally doped as a sensitizer to form a co-doping system. This sensitizer should have a larger absorption cross section to absorb excited photons and is a well resonant with other Ln ions (activator) to ensure efficient energy transfer. $Yb^{3+}$ is mostly used in the UC process as a sensitizer.

The host material generally requires its cations and the doping ions to have close radii in order to reduce the lattice stain in the host. In general, $Na^+$, $Ca^{2+}$ and $y^{3+}$ ions are commonly used as the host cations for UC materials.

Based on the requirements for Ln ions dopants and hosts discussed above, $Er^{3+}$ and $Yb^{3+}$ co-doped hexagonal-phase NaYF4 ($NaYF_4$:Yb,Er) has so far shown the highest UC efficiency and is preferably used in the present application.

The $NaYF_4$:Yb,Er powder may be grinded to the sizes ranging between about 0.3-7 μm. For size smaller than about 0.3 μm, the particles will aggregate together due to Van der Waals' forces; while for size larger than about 7 μm, congestion of the spinneret will occur during the spinning process of the ACY.

Step 202: Making Functional Polymer Chip (FPC)

The grinded powder of the fluorescent material from Step 201 may be mixed into a molten polymer to form a composite material.

The polymer can be those commonly used for yarn production. In some embodiments, the polymer may be selected from polyamide, polyesters including polyethylene terephthalate (PET), polyolefins including polypropylene and polystyrene, vinyl polymers including polyvinyl chloride, polycarbonates including acrylonitrile butadiene styrene (ABS) resins, and the likes. In some embodiments, PET is preferably used.

In the present application, the maximum ratio of up-conversion fluorescent material to the polymer may be about 3:7, in order to achieve the desired uniform distribution of the up-conversion fluorescent material in the ACY.

The molten polymer and the fluorescent material are mixed thoroughly and then allowed to cool until it becomes brittle. The resulting composite product is then cut into tiny chips to form "Functional Polymer Chips" (FPCs).

Step 203: Spinning and Drawing Process of the ACY

During the making of the ACY, FPCs and regular polymer chips are mixed in any desired proportion which allows precise amount control and uniform distribution of the up-conversion fluorescent material in the final ACY.

The regular polymer chips or normal polymer chips (NPCs) may be made from those commonly used for yarn production. Such polymers may be selected from polyamide, polyesters including polyethylene terephthalate (PET), polyolefins including polypropylene or polystyrene, vinyl polymers including polyvinyl chloride, polycarbonates including ABS resins, and the likes. In some embodiments, the polymer chips can be PET chips.

The similar sizes of the FPCs and the regular polymer chips provide the conditions for uniform mixing between the chips. In other aspects, the tiny size of the fluorescent materials may make it difficult to mix evenly with the regular polymer chips of much greater size, as the tiny fluorescent particles tend to fall to the bottom through the space between the polymer chips.

The maximum weight percentage of the up-conversion material in the final ACY may be about 1.8%. This can be achieved by using a weight ratio of 6:94 between FPC and regular polymer chips. For example, in 100 g of final ACY, the amount of FPC may constitute 6% by weight, while in FPC, the amount of up-conversion fluorescent material may constitute 30% by weight. That is, the amount of up-conversion fluorescent material is 1.8 g in 100 g of ACY.

In some embodiments of the present application, a mixture of the FPC and the regular polymer chip may be spun using a spinneret. In particular, the FPC and the regular polymer chip may be mixed and melted, and the melt is extruded through the spinneret to form filaments. The filaments may then subject to art cooling at room temperature.

A spinneret having a hole of different shapes such as round, trilobal, pentalobal, hexalobal or octalobal can be used for special effects like opacity, luster or its suppression, wicking, or tactile comfort. Hollow fibers may be produced to make it lightweight and for providing greater cushioning or insulative properties. Crepe effect can be obtained through crimps Certain additives may also be combined with the spinning solutions/mixtures for specific properties. Delusterant can be added to make the fiber dull, a flame retardant may be added or certain other antistatic substances may also be included.

After extrusion from the spinneret, the filaments may be cooled by any suitable method, such as air cooling at room temperature.

After extrusion from the spinneret, the filaments may be drawn or elongated, for example, with the help of godet wheels to form the ACY. Depending upon the desired properties, the fibers are usually drawn to several times of its original length. For higher tenacity, the filaments are drawn to a greater extent. The fibers solidify upon contact with air. Usually, the fibers are drawn hot as it produces more uniform fibers. During the drawing process, fibers may be textured which saves time, efforts and production cost and also gives greater quality control over the finished fibers.

The method of making ACY in the present application may further include using one or more functional materials alone or simultaneously. These functional materials include, but not limited to, fluorescent materials with different emission wavelengths, metallic and magnetic materials.

The ACY prepared by the above described method has similar or improved coloring/dyeing abilities comparing to the regular polymer yarns, such as polyester yarns. The ACY of the present application can be in any color based on the color of the FCPs and the polymer chips, or can be dyed into any color just as regular polymer yarns, such as polyester yarns. The anti-counterfeiting property of the ACY of the present application can be permanent as the up-conversion fluorescent material is blended into the yarn at molecular level rather than being simply a surface coating of the yarn. In this way, the anti-counterfeiting function will not be washed away easily when it is used in textile products. The amount of the fluorescent materials can be controlled, and the fluorescent materials are uniformly distributed throughout the yarns using the method of this application.

Another aspect of the present application is to provide an anti-counterfeiting yarn with uniformly distributed and controllable amount of up-conversion fluorescent material, which can be produced from the above described method.

Figure 1:
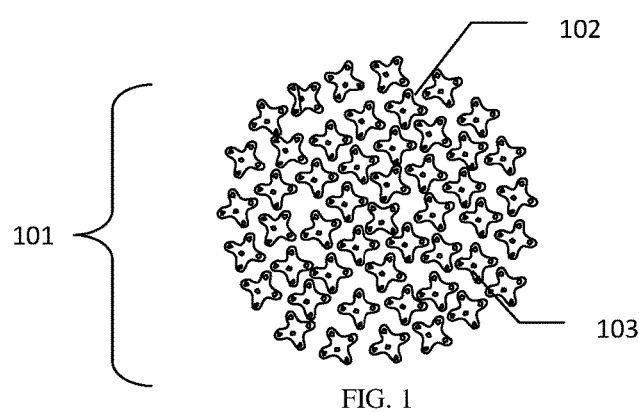
FIG. 1 illustrates a cross-sectional view of an anti-counterfeiting yarn according to an embodiment of the present application.

Referring to FIG. 1, one specific example of the ACY (101) of the present application is composed of 48 polyester filaments (102). Up-conversion fluorescent material (103) is uniformly distributed throughout each filament. From the cross-sectional view, it can be seen that the filaments (102) used in the present application are in round-cross shape. The high surface-area-to-volume ratio of the round-cross shape provides a higher chance of the fluorescent material being exposed, thus giving a greater efficiency in the up-conversion process.

The ACY preparation method of the present application can provide a white or colored polyester yarn with up-conversion fluorescent material. The fluorescence of ACY can be identified by any commercially available fluorescent detector. Colored ACY can be prepared by either dope or disperse dyeing methods. In some examples of the present application, dope dyed ACY can be made by mixing the dye and the polymer before the spinning and drawing processes. This gives the ACY excellent color fastness and light fastness.

Example

The following examples are presented to exemplify embodiments of the application but are not intended to limit the application to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in the example should not be construed as necessary features of the application.

Unless a specific source is indicated, all chemicals used in the following examples are available from general chemical suppliers, for example, Sigma-Aldrich Co. (St. Louis, Mo.) or The Dow Chemical Company (Midland, Mich.).

$NaYF_4$:Yb,Er was grinded to the size between 0.7-3 µm. Esterification of 700 g terephthalic Acid (TPA) with 400 g Ethylene Glycol (EG) was made. The mixture was raised to the temperature of 260° C. and allowed to react for 90 minutes. The reaction temperature was then raised to 285° C. to allow polycondensation to occur. The by-product EG was separated from the molten polymer using high vacuum. The time of reaction took 120 minutes at 285° C. 300 g $NaYF_4$:Yb,Er was mixed with the molten polyester, followed by extruding the obtained mixture through a slot of 5 mm in diameter to form long ribbons. The long ribbons were cooled down until the polyester become brittle, and then cut into chips of 5 mm in diameter to form Functional Polymer Chips (FPCs). Normal polymer chips (PET chips) and FPCs with similar size were mixed in a weight ratio of 94:6 (940 g of NPC and 60 g of FPC) in the spinneret and melted at 260° C. The melted polymer was forced through 48 round-cross shape tiny holes with slit width 0.05 mm of the spinneret. The emerging fibers were brought together by a drawing process to form the Anti-Counterfeiting Yarn which contains a maximum of 1.8 wt % of the up-conversion fluorescent material.

Figure 3:
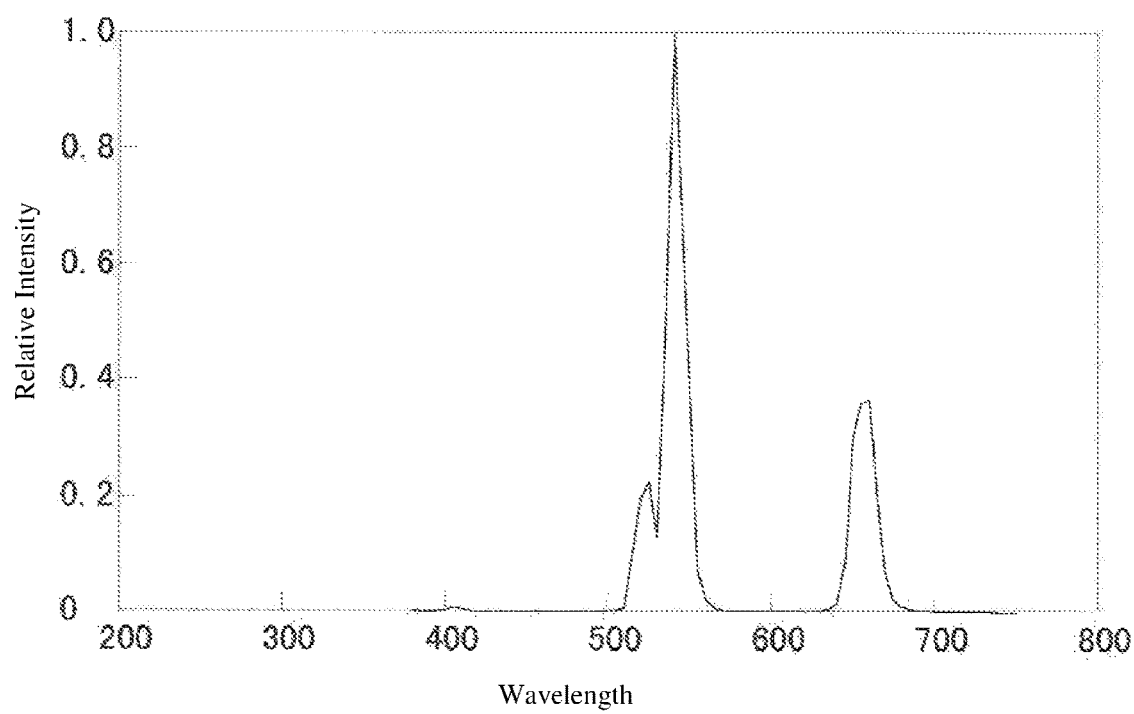
FIG. 3 shows the spectral distribution of $NaYF_4:Yb,Er$ upon excitation by Infrared Radiation (IR) in the 940-980 nm range.

As shown in FIG. 3, the ACY produced by the above example maintains the same response of the $NaYF_4$:Yb,Er, fluorescing in the green range of visible light (540 nm) with an IR excitation source in the 940-980 nm range (FIG. 3).

Thus, specific anti-counterfeiting yarn and its preparation method have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of preparing an anti-counterfeiting yarn, comprising:
   providing an up-conversion fluorescent material in a powder form having a particle size of about 0.3-7 µm;
   mixing the up-conversion fluorescent material with a molten polymer material to form a composite material;
   cooling the composite material, followed by cutting to provide a functional polymer chip (FPC);
   mixing the FPC with a polymer chip not containing the up-conversion fluorescent material in a ratio such that the fluorescent material is uniformly distributed in the mixture, followed by melting the mixture;

extruding the melt of the FPC and the polymer chip not containing the up-conversion fluorescent material into filaments; and producing the anti-counterfeiting yarn through spinning and drawing the filaments, wherein the up-conversion fluorescent in the anti-counterfeiting yarn comprises a maximum weight percent of about 1.8%.

2. The method of claim 1, wherein the molten polymer material and the polymer chip not containing the up-conversion fluorescent material are each made of at least one polymer selected from the group consisting of polyamide, polyester, polyolefin, polycarbonate, and vinyl polymer.

3. The method of claim 2, wherein the polymer comprises at least one polymer selected from the group consisting of polyethylene terephthalate, polypropylene, polystyrene, polyvinyl chloride, and ABS resin.

4. The method of claim 2, wherein the polymer comprises polyethylene terephthalate.

5. The method of claim 1, wherein the up-conversion fluorescent material comprises lanthanide ions.

6. The method of claim 5, wherein the up-conversion fluorescent material comprises yttrium fluoride doped with ytterbium and erbium.

7. The method of claim 1, wherein the FPC and the polymer chip not containing the up-conversion fluorescent have a similar size, such that the chips can be uniformly mixed.

8. The method of claim 1, further comprising mixing dyes with the FPC and the polymer chip not containing the up-conversion fluorescent material.

* * * * *